(12) United States Patent
Park et al.

(10) Patent No.: US 10,528,640 B2
(45) Date of Patent: Jan. 7, 2020

(54) BI-DIRECTIONAL FIFO MEMORY AND CONVOLUTION PROCESSING DEVICE USING THE SAME

(71) Applicant: KOREA UNIVERSITY RESEARCH AND BUSINESS FOUNDATION, Seoul (KR)

(72) Inventors: Jongsun Park, Seoul (KR); Woong Choi, Bucheon-si (KR)

(73) Assignee: Korea University Research and Business Foundation, Seoul (KR)

( * ) Notice: Subject to any disclaimer, the term of this patent is extended or adjusted under 35 U.S.C. 154(b) by 8 days.

(21) Appl. No.: 15/987,072

(22) Filed: May 23, 2018

(65) Prior Publication Data

US 2018/0341621 A1 Nov. 29, 2018

(30) Foreign Application Priority Data

May 23, 2017 (KR) .......................... 10-2017-0063623

(51) Int. Cl.
*G06F 17/15* (2006.01)
*G06N 3/063* (2006.01)
*G06F 5/06* (2006.01)

(52) U.S. Cl.
CPC .............. *G06F 17/15* (2013.01); *G06F 5/065* (2013.01); *G06N 3/063* (2013.01)

(58) Field of Classification Search
CPC ................................ G06F 17/15; G06F 17/153
See application file for complete search history.

(56) References Cited

U.S. PATENT DOCUMENTS

| 6,049,859 A * | 4/2000 | Gliese ............... G06F 15/17337 712/17 |
| 6,316,979 B1 | 11/2001 | Keeth |
| 2006/0170643 A1 * | 8/2006 | Katayama ............ G09G 3/3677 345/100 |
| 2016/0314555 A1 * | 10/2016 | Zhu .......................... H04N 5/91 |
| 2018/0189652 A1 * | 7/2018 | Korthikanti ........... G06F 17/153 |

FOREIGN PATENT DOCUMENTS

KR 10-2017-0023708 A 3/2017

* cited by examiner

*Primary Examiner* — Chuong D Ngo
(74) *Attorney, Agent, or Firm* — NSIP Law (57) ABSTRACT

Provided is a device configured to perform a convolution operation. The device includes bi-directional First In First Out memory including bi-directional latches configured to transfer data in a first direction or a second direction depending on a clock signal and connected to each other and performs a convolution operation of an input value and a filter. The device stores first input values corresponding to a window equivalent to a size of the filter from a input value matrix in the bi-directional First In First Out memory in response to a first convolution operation and stores second input values corresponding to a location of the window which is moved in the first direction or the second direction by a predetermined amount from locations of the first input values in the bi-directional First In First Out memory in response to a second convolution operation subsequent to the first convolution operation.

4 Claims, 9 Drawing Sheets

ific BI-DIRECTIONAL FIFO MEMORY AND
CONVOLUTION PROCESSING DEVICE
USING THE SAME

CROSS-REFERENCE TO RELATED
APPLICATION

This application claims the benefit under 35 USC 119(a) of Korean Patent Application No. 10-2017-0063623 filed on May 23, 2017, in the Korean Intellectual Property Office, the entire disclosures of which are incorporated herein by reference for all purposes.

TECHNICAL FIELD

The present disclosure relates to a First In First Out (FIFO) memory and a convolution processing device which can be used in a convolutional neural network (CNN).

BACKGROUND

A convolutional neural network which has recently shown performance similar to human cognitive ability in image processing is being actively researched. In general, the convolutional neural network uses a deep learning-based algorithm and is implemented with hardware in which a CPU, a GPU, a memory, and other operation logics are integrated.

The convolutional neural network hardware performs a convolution operation for producing an output value by applying a predetermined filter to image data in various stages. That is, the convolutional neural network hardware performs a dot-product operation between an input value and a filter weight value. This operation is relatively simply configured like multiply and add operations but has parameters with various and high values and thus is difficult to implement in hardware.

In order to process a huge amount of parameter, a large amount of data is loaded from a memory located outside a processor (or chip) into the processor, and this process consumes considerable power.

In this regard, Korean Laid-open Publication No. 10-2017-0023708 discloses a convolutional neural network computing apparatus.

SUMMARY

In view of the foregoing, the present disclosure provides a bi-directional First In First Out memory having a new structure to be applied to a convolution processing device.

However, problems to be solved by the present disclosure are not limited to the above-described problems. There may be other problems to be solved by the present disclosure.

According to a first aspect of the present disclosure, a bi-directional latch circuit includes: a data storage unit including a first inverter and a second inverter; a first tri-state inverter of which an output end is connected to an input end of the first inverter and which is activated in synchronization with a first clock signal; and a second tri-state inverter of which an output end is connected to an input end of the second inverter and which is activated in synchronization with a second clock signal. Herein, the bi-directional latch circuit transfers an output from the first tri-state inverter to the data storage unit in response to application of the first clock signal and transfers an output from the second tri-state inverter to the data storage unit in response to application of the second clock signal.

According to a second aspect of the present disclosure, a bi-directional First In First Out memory includes multiple bi-directional latches configured to transfer data in a first direction or a second direction depending on a clock signal and connected to each other, and the bi-directional latch includes: a data storage unit including a first inverter and a second inverter; a first tri-state inverter of which an output end is connected to an input end of the first inverter and which is activated in synchronization with a first clock signal; and a second tri-state inverter of which an output end is connected to an input end of the second inverter and which is activated in synchronization with a second clock signal. Herein, the bi-directional latch transfers an output from the first tri-state inverter to the data storage unit in response to application of the first clock signal and transfers an output from the second tri-state inverter to the data storage unit in response to application of the second clock signal.

According to a third aspect of the present disclosure, a convolution processing device configured to perform a convolution operation in a convolutional neural network includes at least one bi-directional First In First Out memory including multiple bi-directional latches configured to transfer data in a first direction or a second direction depending on a clock signal and connected to each other. Herein, when the convolution processing device performs a convolution operation of an input value and a filter, the convolution processing device stores first input values corresponding to a window equivalent to a size of the filter from a input value matrix in the bi-directional First In First Out memory in response to a first convolution operation and stores second input values corresponding to a location of the window which is moved in the first direction or the second direction by a predetermined amount from locations of the first input values from the input value matrix in the bi-directional First In First Out memory in response to a second convolution operation subsequent to the first convolution operation. Herein, the amount of movement of the window is set to overlap some data of the first input values and the second input values.

According to the present disclosure, a convolution processing device in a convolutional neural network includes a bi-directional FIFO capable of bi-directionally transferring data. Thus, it is possible to remarkably increase a reuse ratio of input values stored in the bi-directional FIFO and thus possible to reduce processing costs of the entire system.

Further, according to the present disclosure, a bi-directional latch having a new structure is improved from a structure of a conventional bi-directional FIFO. Thus, it is possible to reduce the size of the system and also possible to reduce power consumption of the bi-directional latch.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 6A to FIG. 6C are diagrams illustrating a structure of a bi-directional FIFO in accordance with various embodiments described herein.

DETAILED DESCRIPTION

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise.

Figure 1:
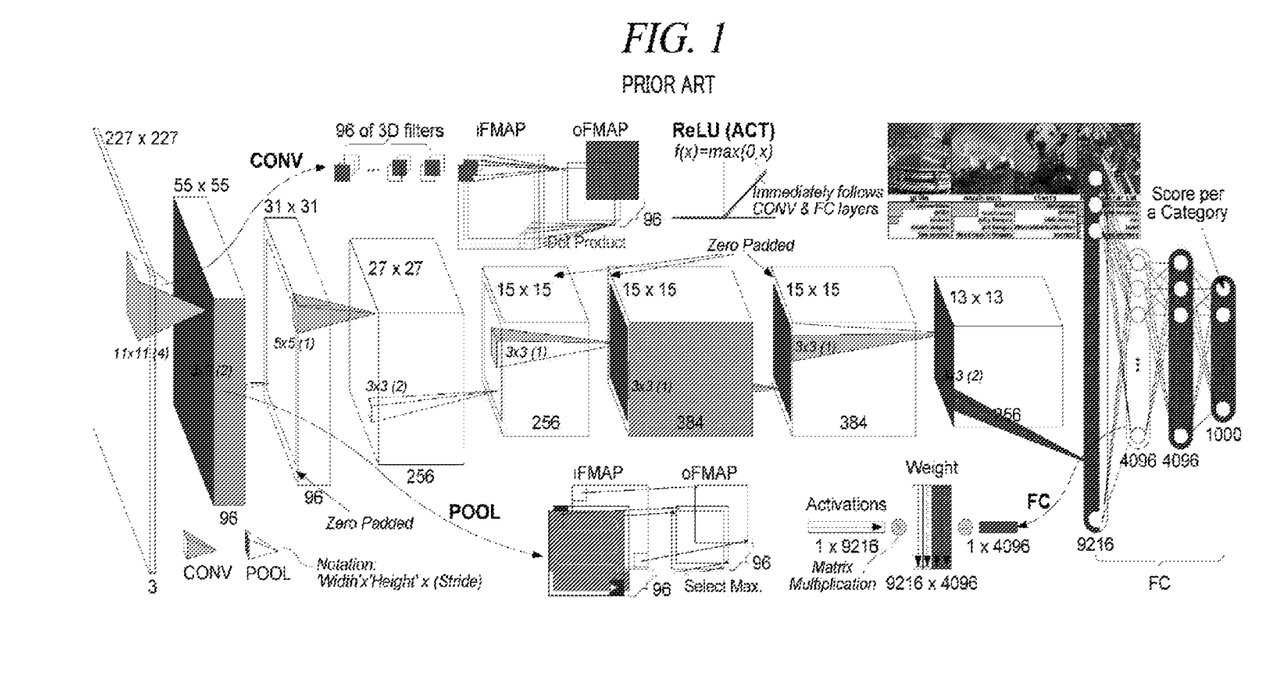
FIG. 1 illustrates an architecture of a typical convolutional neural network.

FIG. 1 illustrates an architecture of a typical convolutional neural network.

As illustrated in FIG. 1, a convolution operation of various filters is performed to an input image in various stages in a convolutional neural network. Through each of the stages, a feature map (FMAP) for each image is extracted. During this filtering process, a FIFO memory is used as a process for performing an operation and a buffer for temporarily storing data. Meanwhile, an architecture of a typical convolutional neural network is ordinary skill in the art, and, thus, detailed descriptions thereof will be omitted.

Figure 2:
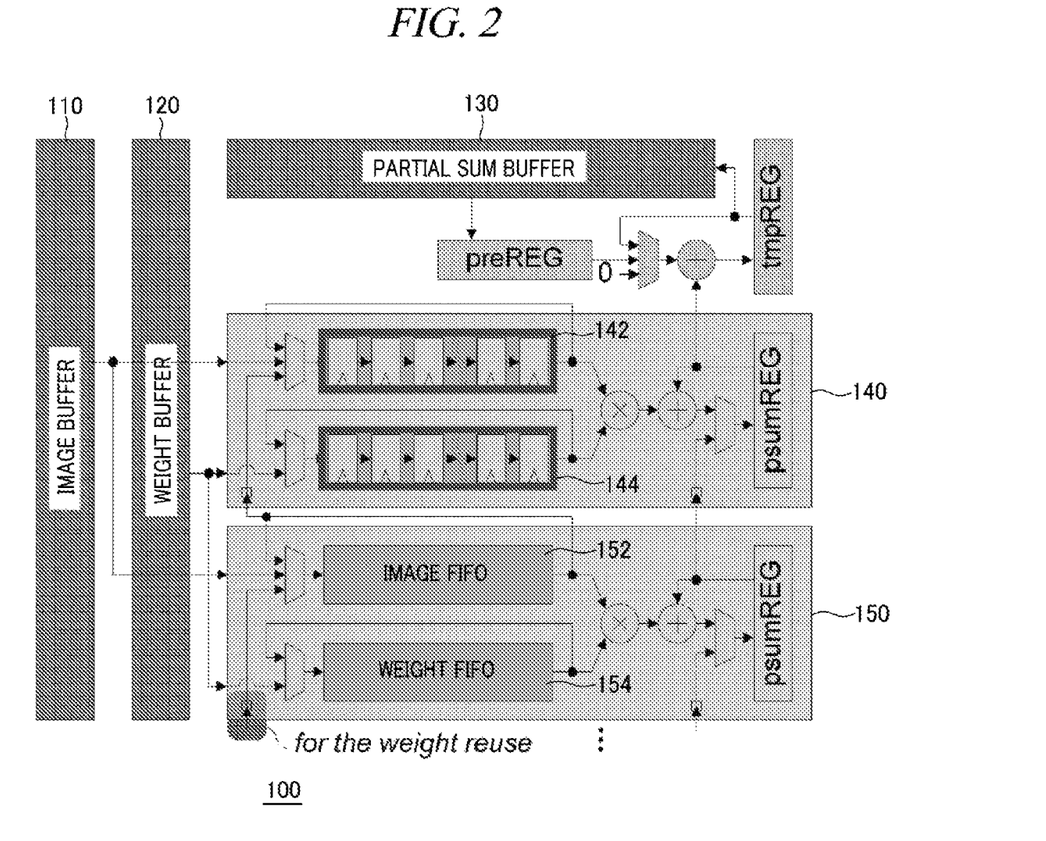
FIG. 2 is a diagram illustrating a structure of a convolution processing device in accordance with various embodiments described herein.
Figure 3A:
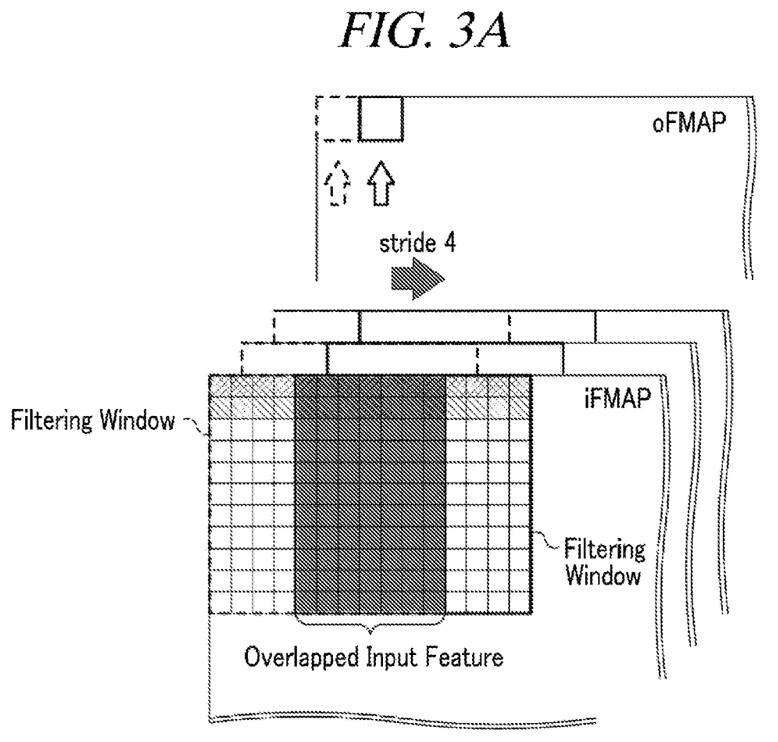
FIG. 3A and FIG. 3B are example diagrams provided to explain a bi-directional convolution processing method by a convolution processing device in accordance with various embodiments described herein.
Figure 3B:
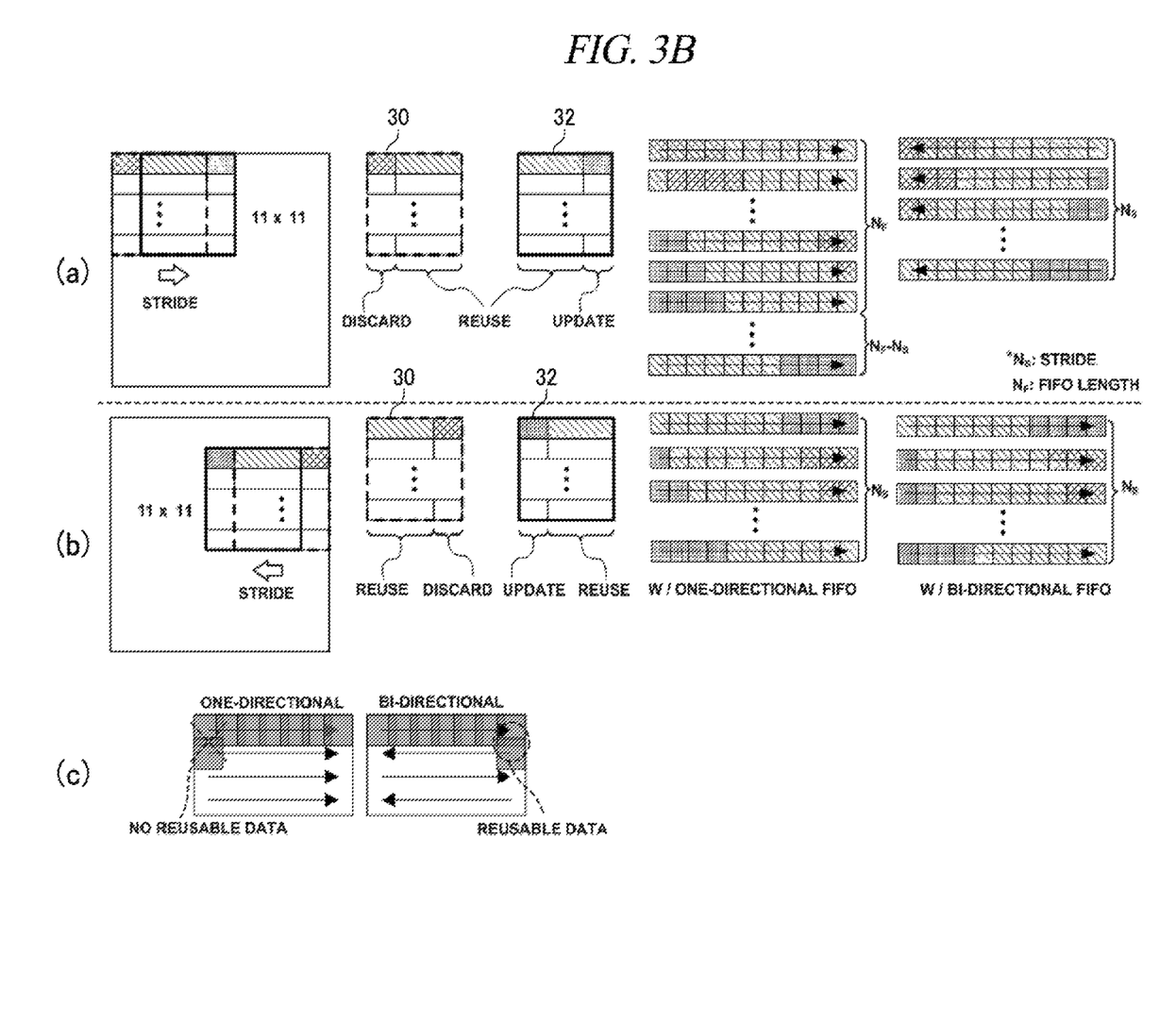
Figure 4:
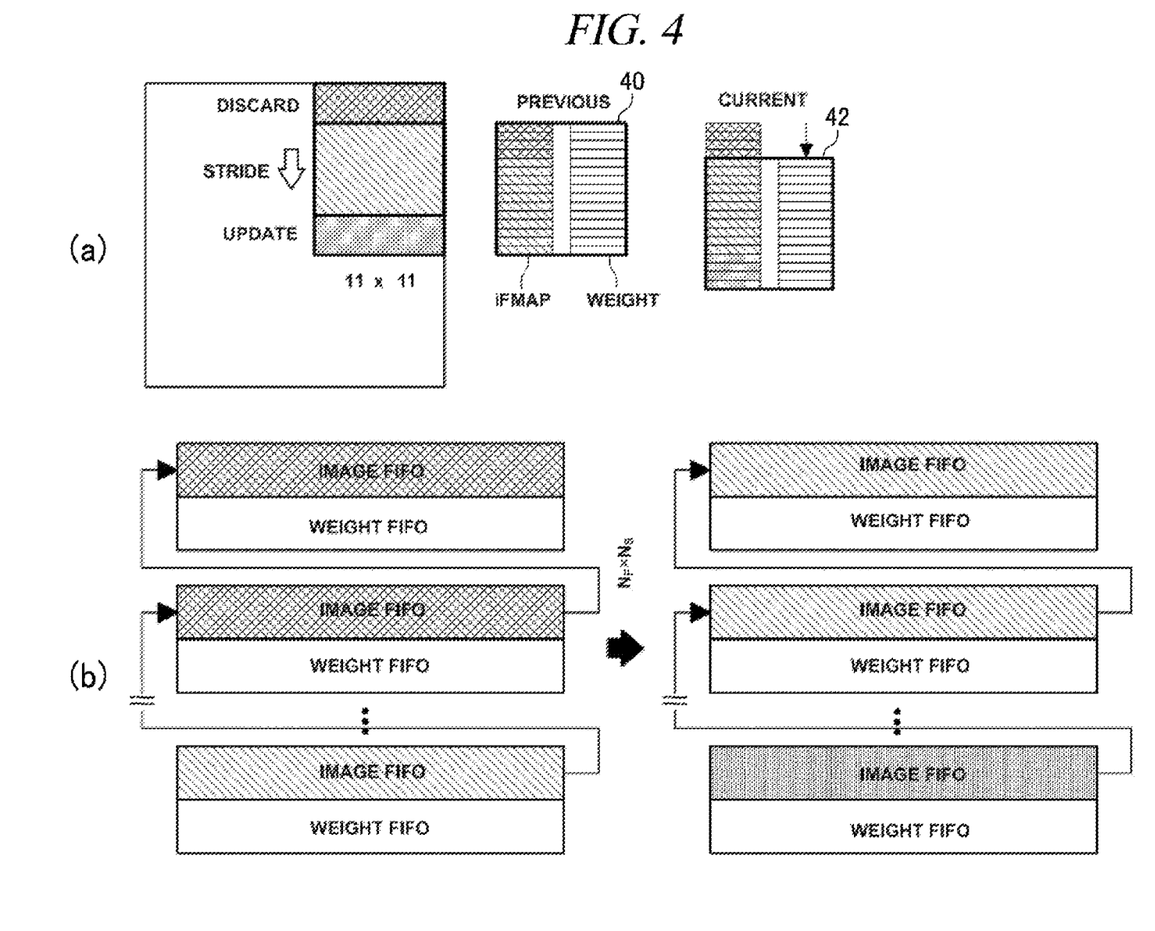
FIG. 4 is an example diagram provided to explain a bi-directional convolution processing method by a convolution processing device in accordance with various embodiments described herein.

FIG. 2 is a diagram illustrating a structure of a convolution processing device in accordance with various embodiments described herein, and FIG. 3 and FIG. 4 are diagrams provided to explain a bi-directional convolution processing method by a convolution processing device in accordance with various embodiments described herein.

As illustrated in FIG. 2, a convolution processing device 100 includes an image buffer 110 configured to store image data, a weight buffer 120 configured to store filter weight values, a partial-sum buffer 130 configured to store partial-sum results, multiple processing units 140 and 150 configured to perform a convolution operation to image data and a filter weight value, and image FIFOs 142 and 152 and weight FIFOs 144 and 154 included in the respective processing units 140 and 150.

In each of the processing units 140 and 150, data values stored in each FIFO memory are multiplied and added to produce a convolution operation result.

In a conventional FIFO memory, data are transferred in a single direction and thus difficult to reuse. Therefore, conventionally, during a convolution operation, a process of repeatedly reading image data from an external memory has consumed considerable power.

The convolution processing device 100 according to an embodiment of the present disclosure can solve the above-described power consumption problem which may occur during a convolution operation.

Referring to FIG. 3A, the convolution processing device 100 moves a window corresponding to a size of a predetermined filter weight on an input value matrix iFMAP that represents input image data, to transfer an input value corresponding to the window to the image FIFO 152. In this case, the window is moved so that the input values have a predetermined overlapped area. That is, as illustrated in FIG. 3A, a first window and a second window have an overlapped area, and, thus, some input values corresponding to the first window and some input values corresponding to the second window are overlapped.

Referring to FIG. 3B, if the window is moved in a first direction, data to be discarded are located on the left of overlapped data and new data are located on the right of the overlapped data. In contrast, if the window is moved in a second direction, the data to be discarded are located on the right of the overlapped data and the new data are located on the left of the overlapped data. Further, the data to be discarded and the new data are determined depending on the amount of movement of the window.

For example, FIG. 3A and FIG. 3B show that the amount of movement (i.e., the length of a stride) of the window and the window has a size of 11×11.

A process of storing data specified by a first window 30 and then storing data specified by a second window 32 will be described with reference to FIG. 3B.

As illustrated in FIG. 3B-(A), if the window proceeds in the first direction (to the right), some of the data specified by the first window 30 become targets to be discarded and are located on the left of overlapped data and some of the data specified by the second window 32 become target to be newly input and are located on the right of the overlapped data.

Further, as illustrated in FIG. 3B-(B), the window may proceed in the second direction (to the left). That is, if the window proceeds in the first direction (to the right) on the input value matrix and reaches an end of the input value matrix, the window is moved by a predetermined amount in a vertical direction and then moved in the second direction (to the left). In this case, since the window is moved in the second direction (to the left), the data to be discarded are located on the right of the overlapped data and the new data are located on the left of the overlapped data.

Referring to FIG. 3B-(A), just by transferring data to be discarded among the data specified by the first window 30 to an end in the second direction opposite to the first direction according to the function of the bi-directional FIFO memory of an embodiment of the present disclosure, the data to be discarded can be easily deleted. This is because the data to be discarded can be transferred in a direction closest to a storage location of the data to be discarded and then output. Data to be updated can be input at the same time when the data are discarded.

In this case, it is possible to delete data to be discarded and input new data just by transferring data by the amount of movement of the window (i.e., the length of a stride) after changing a data transfer direction of the bi-directional FIFO memory, and an operation for newly inputting data overlapped therebetween does not need to be performed. Therefore, it is possible to minimize the throughput of the bi-directional FIFO memory.

Referring to FIG. 3B-(B), just by transferring data to be discarded among the data specified by the first window 30 to an end in the first direction opposite to the second direction according to the function of the bi-directional FIFO memory of an embodiment of the present disclosure, the data to be discarded can be easily deleted. This is because the data to be discarded can be transferred in a direction closest to a storage location of the data to be discarded and then output. Data to be updated can be input at the same time when the data are discarded.

Referring to FIG. 3B-(C), in a conventional one-directional FIFO memory, data can be transferred in only one direction, and, thus, all of a process for moving all data to an end of one direction to delete data to be discarded, a subsequent process for reading overlapped data, and a process for reading data to be updated need to be performed. In this case, since the data to be discarded are located on the left of the overlapped data, an operation for transferring the data by a length of the FIFO memory needs to be performed to delete the data to be discarded.

However, in the bi-directional FIFO memory according to the present disclosure, data stored therein can be transferred in the first direction (to the right) and also in the second direction (to the left) opposite to the first direction. A detailed structure of the bi-directional FIFO memory for making this possible will be described later with reference to FIG. 5 to FIG. 7B.

Accordingly, in the bi-directional FIFO memory, the window may be located at the end in the first direction or at the end in the second direction on the input value matrix as the window is moved. In this case, when a next input value is set, the window is moved by a predetermined amount in a vertical direction and an input value corresponding to the moved window is stored in the FIFO memory.

For example, referring to FIG. 4A and FIG. 4B, it can be seen that the window is moved in a vertical direction rather than a horizontal direction on the input value matrix. In this case, some of input values before the vertical movement of the window (i.e., the first window 40) and some of input values after the vertical movement of the window (i.e., the second window 42) are overlapped with each other.

Hereinafter, a structure and an operation of the bi-directional FIFO will be described with reference to FIG. 5 to FIG. 7B.

Figure 5:
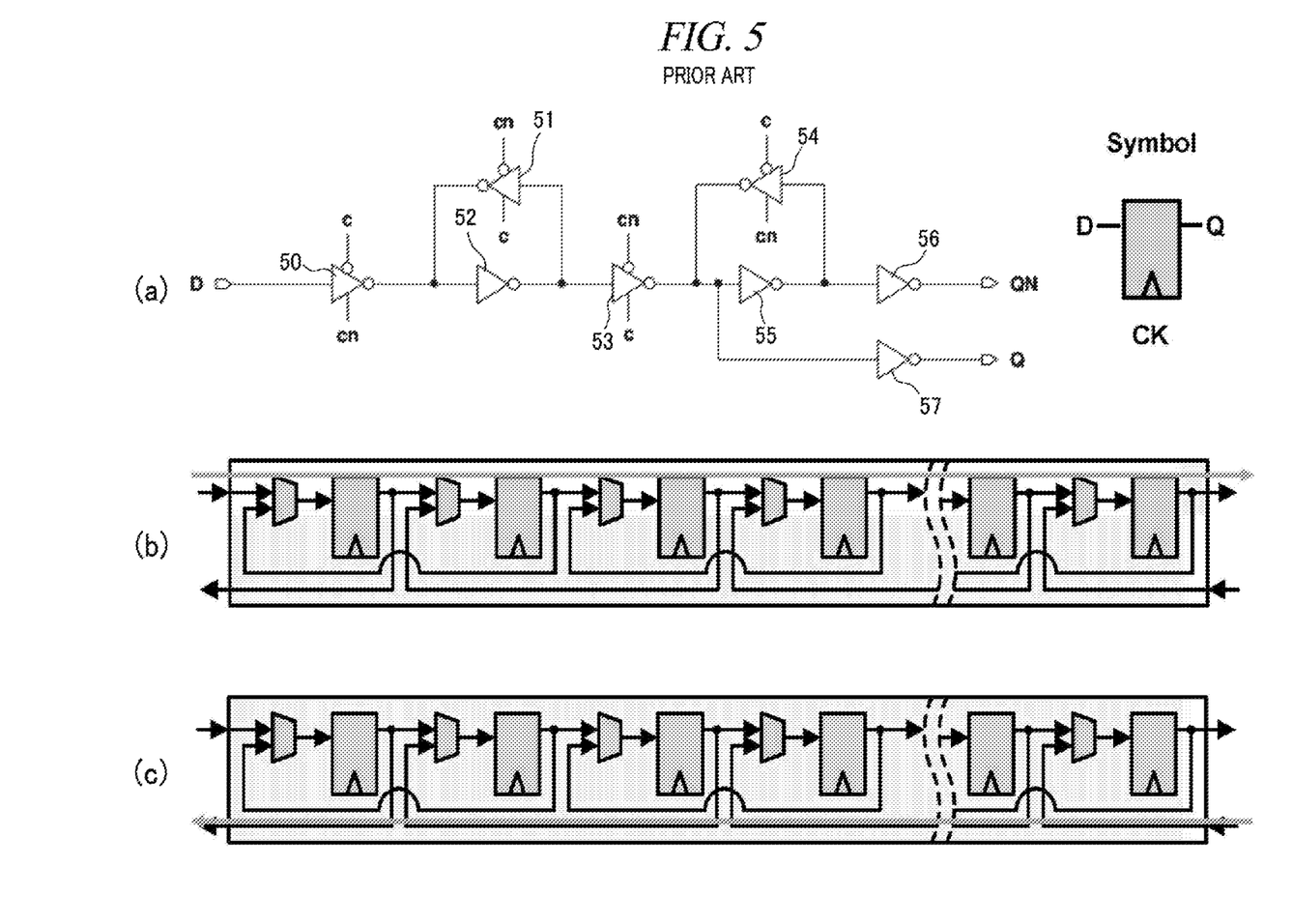
FIG. 5 is a diagram illustrating a structure of a conventional bi-directional FIFO.

FIG. 5 is a diagram illustrating a structure of a conventional bi-directional FIFO.

As illustrated in FIG. 5A, a latch included in the bi-directional FIFO includes a first inverter 50 and a second inverter 53 which operate in synchronization with a clock signal, third and fourth inverters 51 and 52 each connected to the first inverter and configured to perform a data storage operation, fifth and sixth inverters 54 and 55 each connected to the second inverter 53 and configured to perform a data storage operation, and seventh and eighth inverters 56 and 57 each configured to output data.

In this case, the first inverter 50 and the fifth inverter 54 are activated when the clock signal is at a low level, and the second inverter 53 and the third inverter 51 are activated when the clock signal is at a high level.

The bi-directional FIFO can be constructed by combining the above-described latches in series, and a detailed structure thereof is illustrated in FIG. 5B and FIG. 5C.

As illustrated in FIG. 5B and FIG. 5C, multiple latches are connected in series and a multiplexer is added between every two latches. An operation for transferring data in the first direction or an operation for transferring data in the second direction may be selected depending on a selection signal input into the multiplexer. However, in the case where multiplexers are added, as the number of multiplexers increases, a size of an element increases and power consumption increases.

The convolution processing device 100 according to an embodiment of the present disclosure can improve the structure of the bi-directional FIFO in which a size of an element increases and power consumption increases.

Figure 6A:
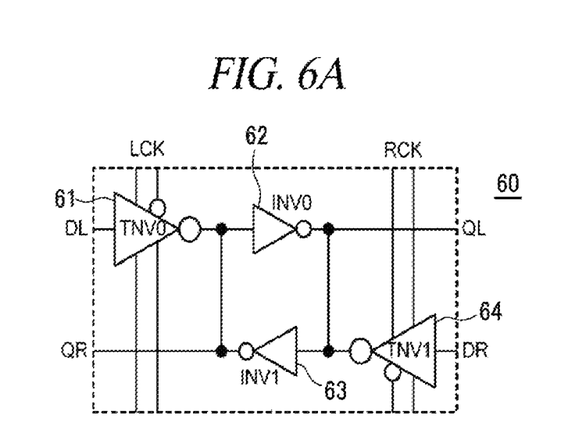
Figure 6B:
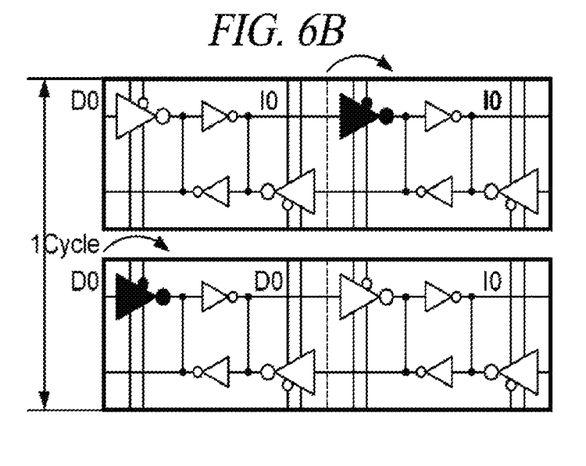
Figure 6C:
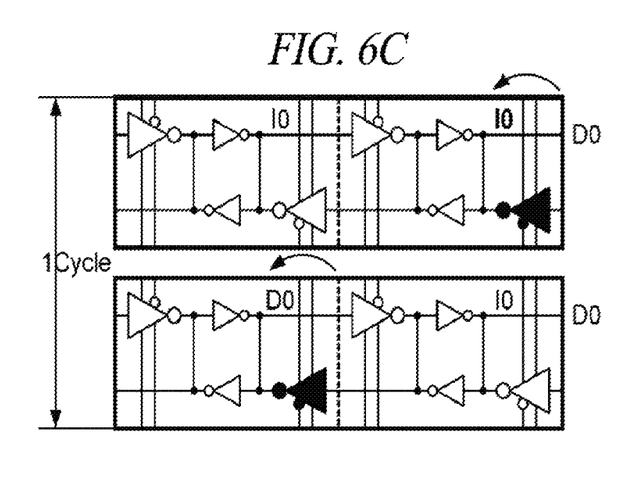
Figure 7A:
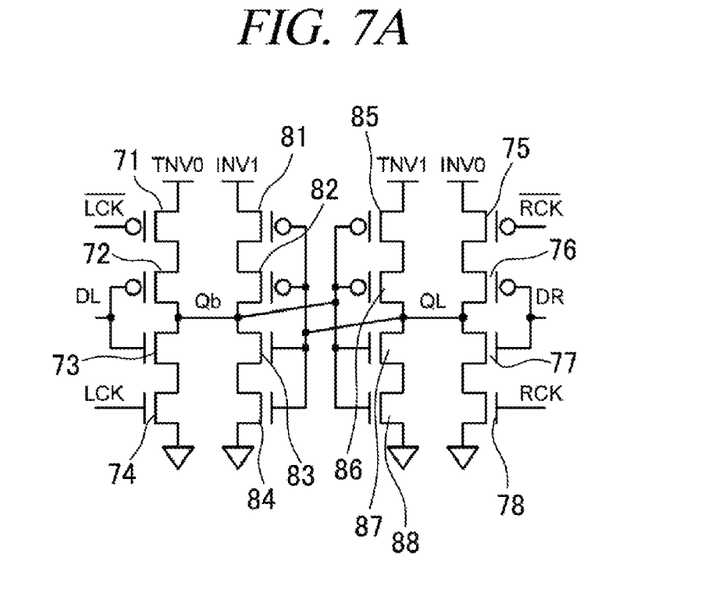
FIG. 7A and FIG. 7B are diagrams illustrating a detailed structure of a bi-directional latch included in a bi-directional FIFO in accordance with various embodiments described herein.
Figure 7B:
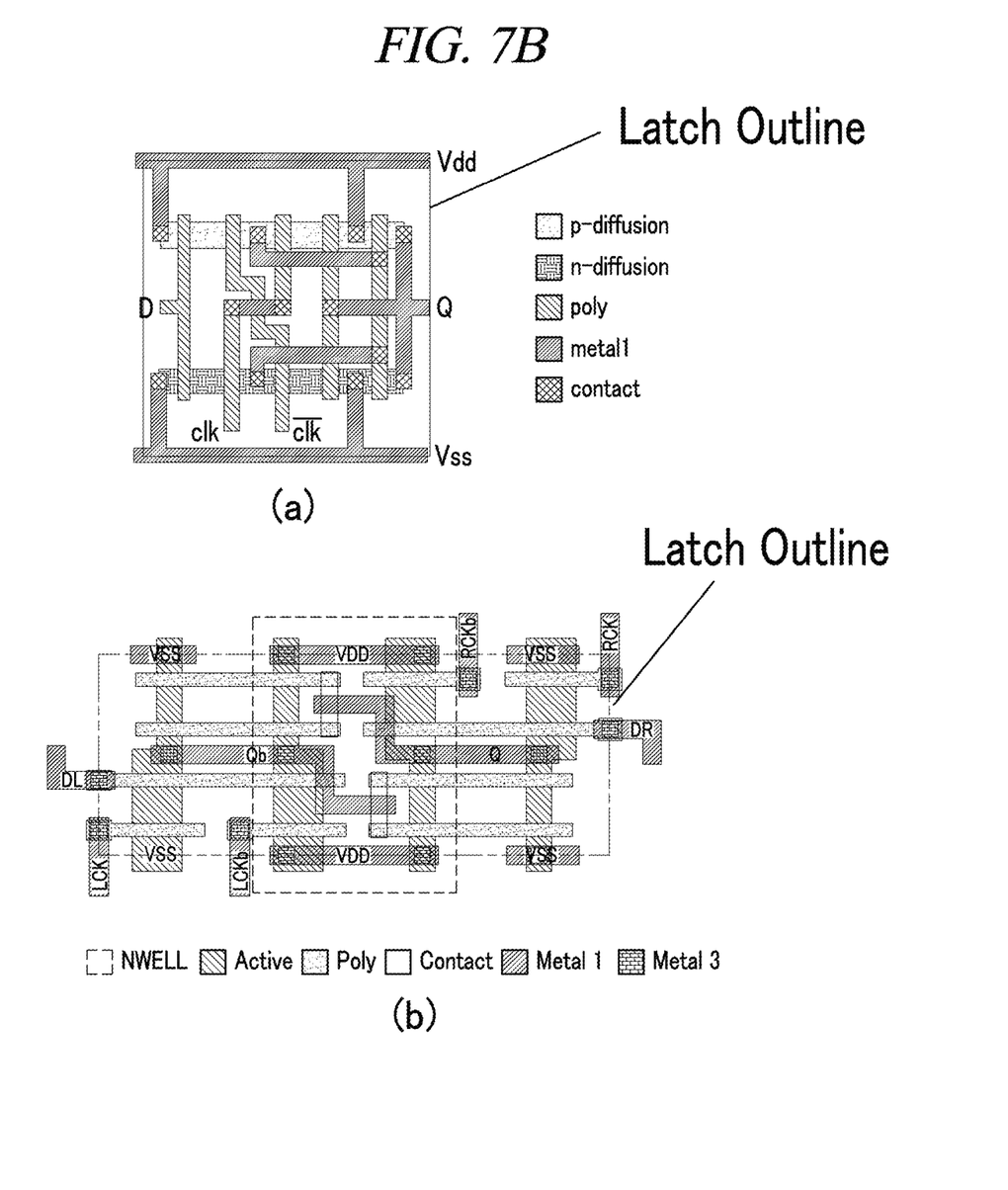

FIG. 6A to FIG. 6C are diagrams illustrating a structure of a bi-directional FIFO in accordance with various embodiments described herein, and FIG. 7A and FIG. 7B are diagrams illustrating a detailed structure of a bi-directional latch included in a bi-directional FIFO in accordance with various embodiments described herein.

As illustrated in FIG. 6A, a bi-directional latch 60 includes a first inverter 62 and a second inverter 63 which constitute a data storage unit, a first tri-state inverter 61 of which an output end is connected to an input end of the first inverter 62 and which is activated in synchronization with a first clock signal LCK, and a second tri-state inverter 64 of which an output end is connected to an input end of the second inverter 63 and which is activated in synchronization with a second clock signal RCK.

In this structure, an output from the first tri-state inverter 61 is transferred to the first inverter 62 and the second inverter 63 serving as the data storage unit in response to application of the first clock signal LCK. Further, an output from the second tri-state inverter 64 is transferred to the first inverter 62 and the second inverter 63 serving as the data storage unit in response to application of the second clock signal RCK.

Referring to FIG. 7A, the first tri-state inverter 61 illustrated in FIG. 6A includes a first P-type switching element 71, a second P-type switching element 72, a first N-type switching element 73, and a second N-type switching element 74 which are sequentially connected in series between a power voltage end and a ground end. Herein, the first P-type switching element 71 is switched in response to an inverted first clock signal $\overline{LCK}$, the second N-type switching element 74 is switched in response to the first clock signal LCK, and the second P-type switching element 72 and the first N-type switching element 73 are switched in response to a first input signal DL. In this structure, when the first clock signal LCK at a high level is applied, all of the first P-type switching element 71 and the second N-type switching element 74 are activated. Thus, the first tri-state inverter 61 performs the same operation as a typical inverter. However, when the first clock signal LCK at a low level is applied, all of the first P-type switching element 71 and the second N-type switching element 74 are inactivated. Thus, the first tri-state inverter 61 cannot function as an inverter.

Referring to FIG. 7A, the second tri-state inverter 64 illustrated in FIG. 6A includes a first P-type switching element 75, a second P-type switching element 76, a first N-type switching element 77, and a second N-type switching element 78 which are sequentially connected in series between a power voltage end and a ground end. Herein, the first P-type switching element 75 is switched in response to an inverted second clock signal $\overline{RCK}$, the second N-type switching element 78 is switched in response to the second clock signal RCK, and the second P-type switching element 76 and the first N-type switching element 77 are switched in response to a second input signal DR. In this structure, when the second clock signal RCK at a high level is applied, all of the first P-type switching element 75 and the second N-type switching element 78 are activated. Thus, the second tri-state inverter 64 performs the same operation as a typical inverter. However, when the second clock signal RCK at a low level is applied, all of the first P-type switching element 75 and the second N-type switching element 78 are inactivated. Thus, the second tri-state inverter 64 cannot function as an inverter.

Meanwhile, referring to FIG. 7A, switching elements 81 to 84 connected to the first tri-state inverter 61 and switching elements 85 to 88 connected to the second tri-state inverter 64 operate as the first inverter 62 and the second inverter 63, respectively, which constitute the data storage unit.

In this structure, the bi-directional FIFO can be constructed without adding multiplexers.

Referring to FIG. 6B again, when the first clock signal LCK is activated, the first tri-state inverter 61 is activated, and an output from the first tri-state inverter 61 is transferred to an inverter constituting the data storage unit. Therefore, data are transferred in the first direction through bi-directional latches included in the FIFO memory. In this case, there may be fighting for data level between the output from the first tri-state inverter 61 and the inverter constituting the data storage unit. Therefore, the first tri-state inverter 61 is designed to have a greater size than the first inverter 62 and the second inverter 63 to enable stable operation.

Referring to FIG. 6C, when the second clock signal RCK is activated, the second tri-state inverter 64 is activated, and an output from the second tri-state inverter 64 is transferred to an inverter constituting the data storage unit. Therefore, data are transferred in the second direction through bi-directional latches included in the FIFO memory. In this case, there may be fighting for data level between the output from the second tri-state inverter 64 and the inverter constituting the data storage unit. Therefore, the second tri-state inverter 64 is designed to have a greater size than the first inverter 62 and the second inverter 63 to enable stable operation.

In the structure described above, contact ends VSS and VDD for power voltage, contact ends DL and DR for data input and contact ends RCK and LCK for clock signal of a bi-directional latch can be easily arranged on an outline of the layout as illustrated in FIG. 7B, and, thus, the bi-directional latch can have a memory bit-cell layout. Therefore, the size can be reduced by up to about 40%.

The convolution processing method according to an embodiment of the present disclosure can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage. The computer storage medium includes all volatile/non-volatile and removable/non-removable media embodied by a certain method or technology for storing information such as computer-readable instruction code, a data structure, a program module or other data.

The method and system of the present disclosure have been explained in relation to a specific embodiment, but their components or a part or all of their operations can be embodied by using a computer system having general-purpose hardware architecture.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A convolution processing device configured to perform a convolution operation in a convolutional neural network, comprising:
    at least one bi-directional First In First Out memory including multiple bi-directional latches configured to transfer data in a first direction or a second direction depending on a clock signal and connected to each other,
    wherein when the convolution processing device performs a convolution operation of an input value and a filter, the convolution processing device stores first input values corresponding to a window equivalent to a size of the filter from a input value matrix in the bi-directional First In First Out memory in response to a first convolution operation and stores second input values corresponding to a location of the window which is moved in the first direction or the second direction by a predetermined amount from locations of the first input values in the bi-directional First In First Out memory in response to a second convolution operation subsequent to the first convolution operation, and
    the amount of movement of the window is set to overlap some data of the first input values and the second input values.

2. The convolution processing device of claim 1,
    wherein the second input values include overlapped data overlapped with the first input values and new data not overlapped with the first input values,
    when the second input values are stored in the bi-directional First In First Out memory where the first input values are stored, if the window is moved in the first direction, the bi-directional First In First Out memory is set to a mode to transfer data in the second direction,
    data among the first input values which are not overlapped with the second input values are moved in the second direction and deleted,
    the new data are moved in the second direction and stored, and
    the overlapped data are moved in the second direction by the amount of movement of the window.

3. The convolution processing device of claim 1,
    wherein the second input values include overlapped data overlapped with the first input values and new data not overlapped with the first input values,
    when the second input values are stored in the bi-directional First In First Out memory where the first input values are stored, if the window is moved in the second direction, the bi-directional First In First Out memory is set to a mode to transfer data in the first direction, data among the first input values which are not overlapped with the second input values are moved in the first direction and deleted, the new data are moved in the first direction and stored, and the overlapped data are moved in the first direction by the amount of movement of the window.

4. The convolution processing device of claim 1, wherein if the window is located at an end in the first direction or at an end in the second direction on the input value matrix as the window is moved, when a next input value is set, the window is moved by a predetermined amount in a direction perpendicular to the first direction or the second direction and an input value corresponding to the moved window is stored in the bi-directional First In First Out memory, and some of input values before the movement of the window and some of input values after the movement of the window are overlapped with each other.

\* \* \* \* \*